US008677394B2

(12) United States Patent
Rouse et al.

(10) Patent No.: US 8,677,394 B2
(45) Date of Patent: Mar. 18, 2014

(54) INTEGRATING AND PROCESSING EMBEDDED LINKS TO RELATED VIDEO CONTENT IN A VIDEO STREAM TO PROVIDE ADVERTISING INFORMATION

(75) Inventors: Alan Rouse, Lawrenceville, GA (US); Charles Dasher, Lawrenceville, GA (US)

(73) Assignee: Ericsson Television Inc., Duluth, GA (US)

(*) Notice: Subject to any disclaimer, the term of this patent is extended or adjusted under 35 U.S.C. 154(b) by 742 days.

(21) Appl. No.: 12/826,104

(22) Filed: Jun. 29, 2010

(65) Prior Publication Data

US 2011/0321083 A1  Dec. 29, 2011

(51) Int. Cl.
G06F 15/16 (2006.01)
G06Q 30/00 (2012.01)
H04N 7/025 (2006.01)
H04N 7/173 (2011.01)

(52) U.S. Cl.
USPC ............. 725/32; 705/14.4; 725/36; 725/114; 725/131; 709/217

(58) Field of Classification Search
None
See application file for complete search history.

(56) References Cited

U.S. PATENT DOCUMENTS

2003/0145338 A1* 7/2003 Harrington .................. 725/136
2004/0040042 A1* 2/2004 Feinleib ....................... 725/112
2006/0130120 A1* 6/2006 Brandyberry et al. ........ 725/136
2009/0307721 A1* 12/2009 Afram et al. ................... 725/34
2010/0098075 A1* 4/2010 Kokernak et al. .............. 725/32
2010/0257550 A1* 10/2010 Slothouber et al. ............ 725/32
2011/0283010 A1* 11/2011 Parchman et al. ............ 709/231

OTHER PUBLICATIONS

Marcelino Ford-Livene; How Will the Internet Impact TV Advertising?; http://www.intelconsumerelectronics.com/Consumer-Electronics-3.0/TV-Advertising.aspx ; Apr. 7, 2010.
Intel; Intel Media Processor CE 3100; Product Brief; 2008.
William O. Leszinske Jr.; Making the Leap: the Internet Comes to the Living Room; http://www.intelconsumerelectronics.com/Archived/Digital-Living-Room.aspx, Apr. 7, 2010.
OC-SP-ETV-BIF1.0-104-070921; OpenCable Specifications ETV; Enhanced TV Binary Interchange Format 1.0, Sep. 21, 2007.
PES—Packet_1; Tektronix, Apr. 7, 2010.
Widget Channel: Personalize, enjoy & share your favorite Internet experiences on TV; http://www.intelconsumerelectronics.com/Consumer-Electronics-3.0/Widget-Channel-Overview.aspx, Apr. 7, 2010.

* cited by examiner

Primary Examiner — Brian Pendleton
Assistant Examiner — Dika C. Okeke

(57) ABSTRACT

In one embodiment, a capability is disclosed for conveying a link to further information over a cable system to a consumer device, wherein the video link can be associated with an external video source. The information can be conveyed to the consume device in one embodiment by embedding the video link information within a stream of MPEG formatted video information using an EBIF application. The video link information can be a URL from which the external information, typically video information, can be received. Upon detecting the link, the consumer device opens up a display window on a television image, which is presented to the viewer in an overlaid manner in addition to the MPEG video information on a television display. Typically, after the external video is presented, the window is closed.

22 Claims, 7 Drawing Sheets

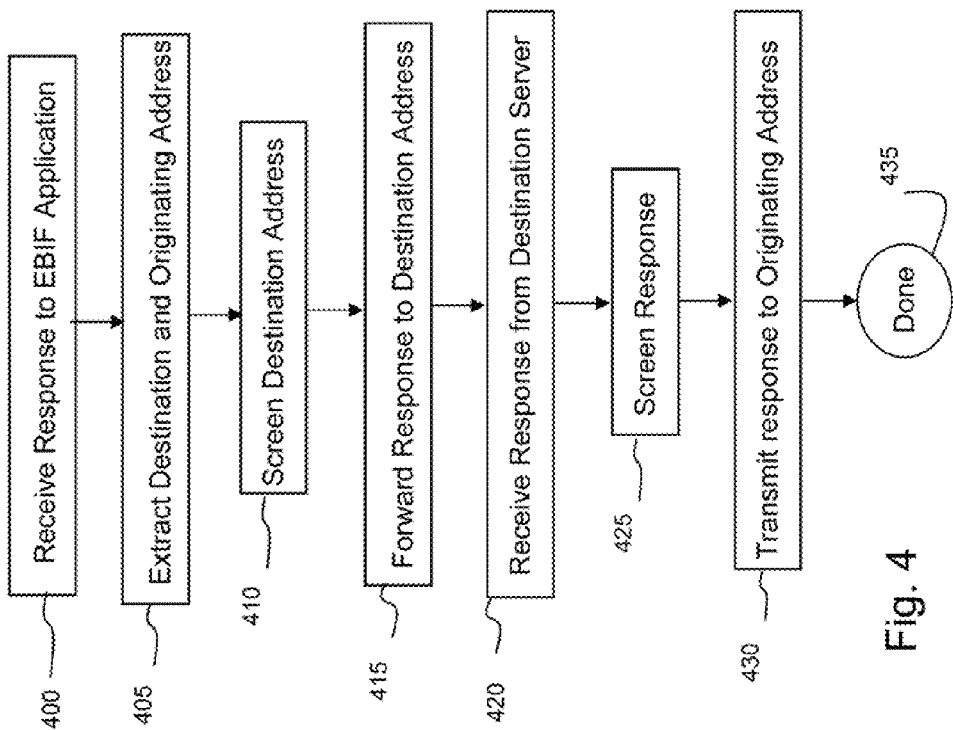

Figure 1A:
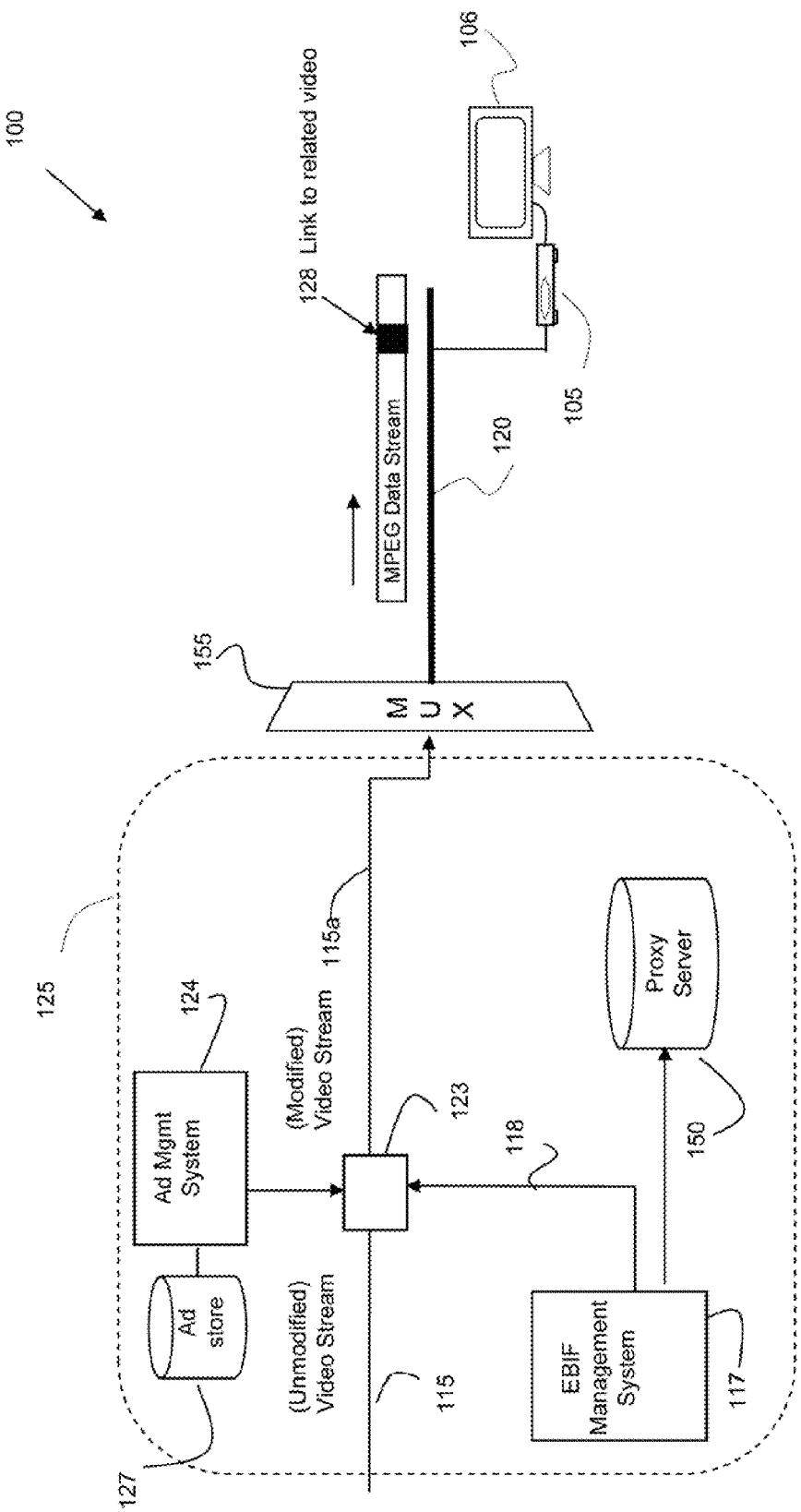

INTEGRATING AND PROCESSING EMBEDDED LINKS TO RELATED VIDEO CONTENT IN A VIDEO STREAM TO PROVIDE ADVERTISING INFORMATION

FIELD OF INVENTION

This invention, in one embodiment, generally pertains to systems and methods for integrating and processing integrated linking information to related video content in a video stream in a cable system.

BACKGROUND OF THE INVENTION

Digital television cable service is commonly available to users desiring to receive television programming. Many cable service providers have converted to only providing digital transmission of video data, because using digital data has facilitated the storage, copying, and other processing functions as well as the more efficient use of bandwidth. For example, digital video recorders readily allow users to easily store and selectively view television programming at their convenience.

Similarly, Internet access service has become largely available to users, and in many instances, users regularly use computers to access Internet based video content. Because computers can now easily store and process digital video files, the Internet has quickly grown in its ability to provide users with video clips or related product information. Some websites can even provide the same television programming content that is available over the cable television network.

Thus, these two services, namely 1) digital television cable service and 2) Internet access to digital video files, share very similar technologies. For example, cable service providers use the same cable distribution network to provide cable service and Internet access to their subscribers. However, in other respects, these two services are distinct in their operation aspects. For example, in most cases, cable television viewers use a digital television for receiving Moving Picture Experts Group (MPEG) based video from a cable service provider and use a separate personal computer for receiving video from the Internet. The control and management of services have largely been distinct as well.

This division between viewing video (or other types of information) using a television and computer is beginning to blur. Manufacturers of MPEG decoder chips used in televisions are beginning to incorporate the ability to receive and process video data in a FLASH® format, thus enabling a television to receive Internet compatible video. Other manufacturers are integrating general purpose processing capabilities with the video processing ICs in televisions. These processors allow small applications to execute on the television (sometimes referred to as "widgets"), which can receive data from an Internet connection and render appropriate display information along with the television program on the display screen.

BRIEF SUMMARY OF THE INVENTION

In one embodiment, an EBIF management system is configured to insert an EBIF application into an MPEG digital video file comprising an advertisement, which is streamed to a viewer in a cable distribution network. A set top box located in the viewer's serving location receives the EBIF application, which includes link information that can be used to derive the address of a server. Upon executing the EBIF application, an EBIF response message is generated by the set top box. An EBIF proxy server receives the EBIF response message from the set top box, and the EBIF response message includes the link information, which the proxy server uses to access the server. Information returned from the server to the EBIF proxy server is transmitted by the EBIF proxy server to the set top box. As a result, the viewer may view product related information, such as in the form of video information, in conjunction with the advertisement.

In another embodiment, a method is provided comprising steps involving an EBIF management system inserting an EBIF application into an MPEG digital video file comprising an advertisement, streaming the advertisement over a cable distribution network to a viewer's set top box. After the set top box executes the EBIF application, it generates an EBIF response message which includes an identifier used to derive an address of a server. An EBIF proxy server receives the EBIF response message and derives the address of the server, and generates a message to the server. The EBIF proxy server receives information from the server, which may be product related information, and transmits the information to the set top box.

Further embodiments of the invention are directed to computer readable medium performing steps using executable code with similar functionality. The above description is only a general overview of certain embodiments of the invention and is not intended to limit the scope of the invention to only these embodiments.

BRIEF DESCRIPTION OF THE SEVERAL VIEWS OF THE DRAWING(S)

Figure 1B:
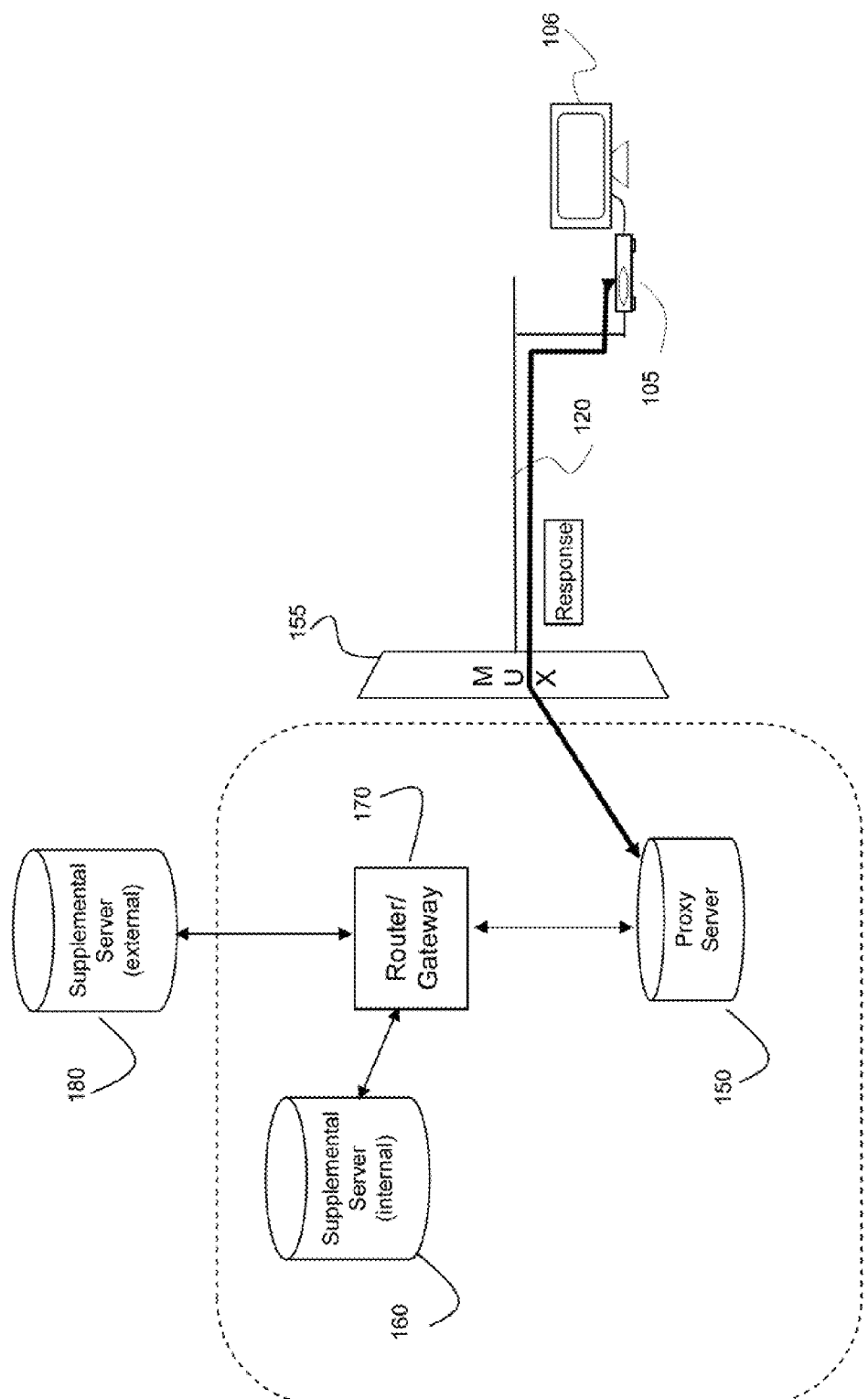
Figure 2:
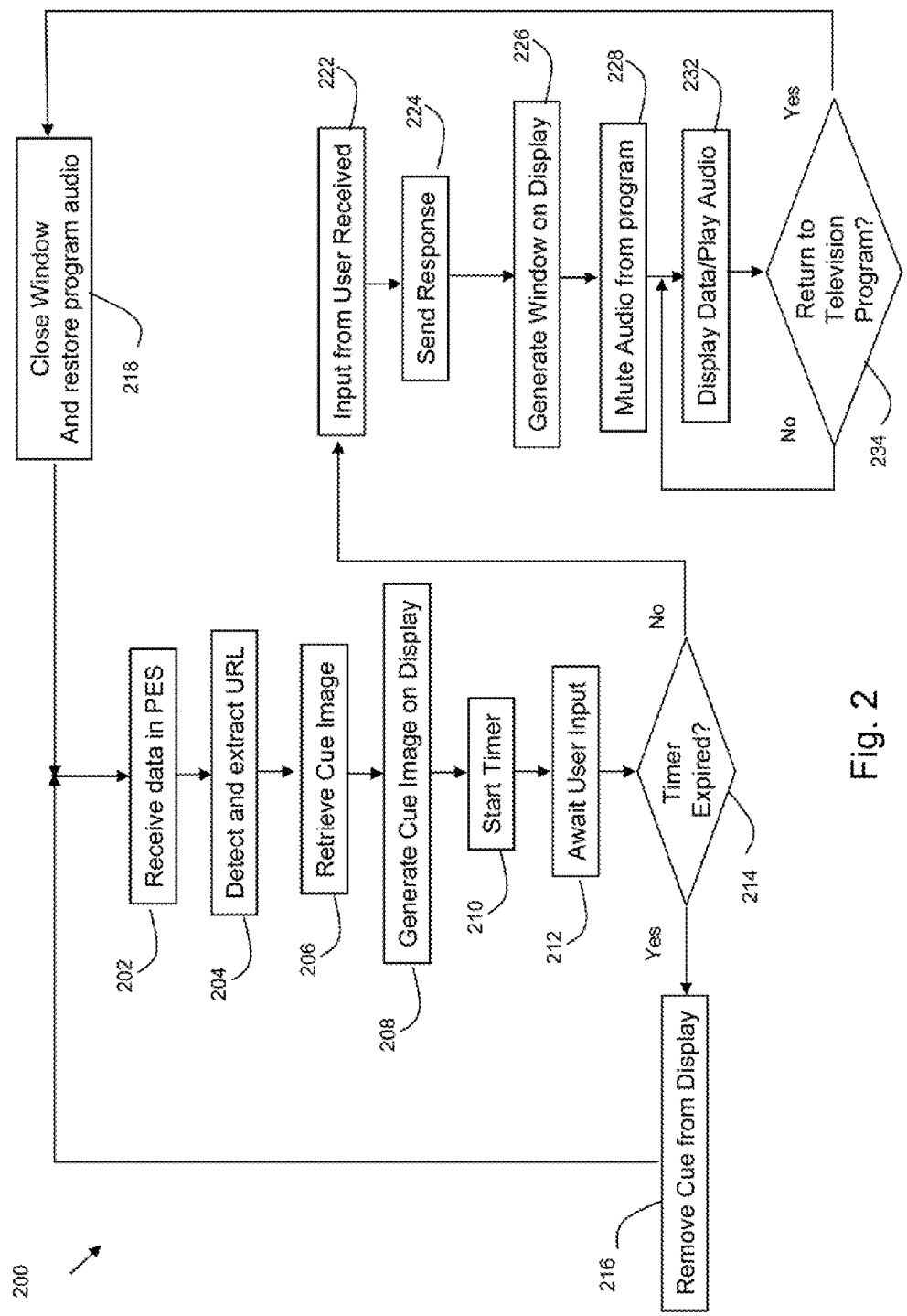
Figure 3:
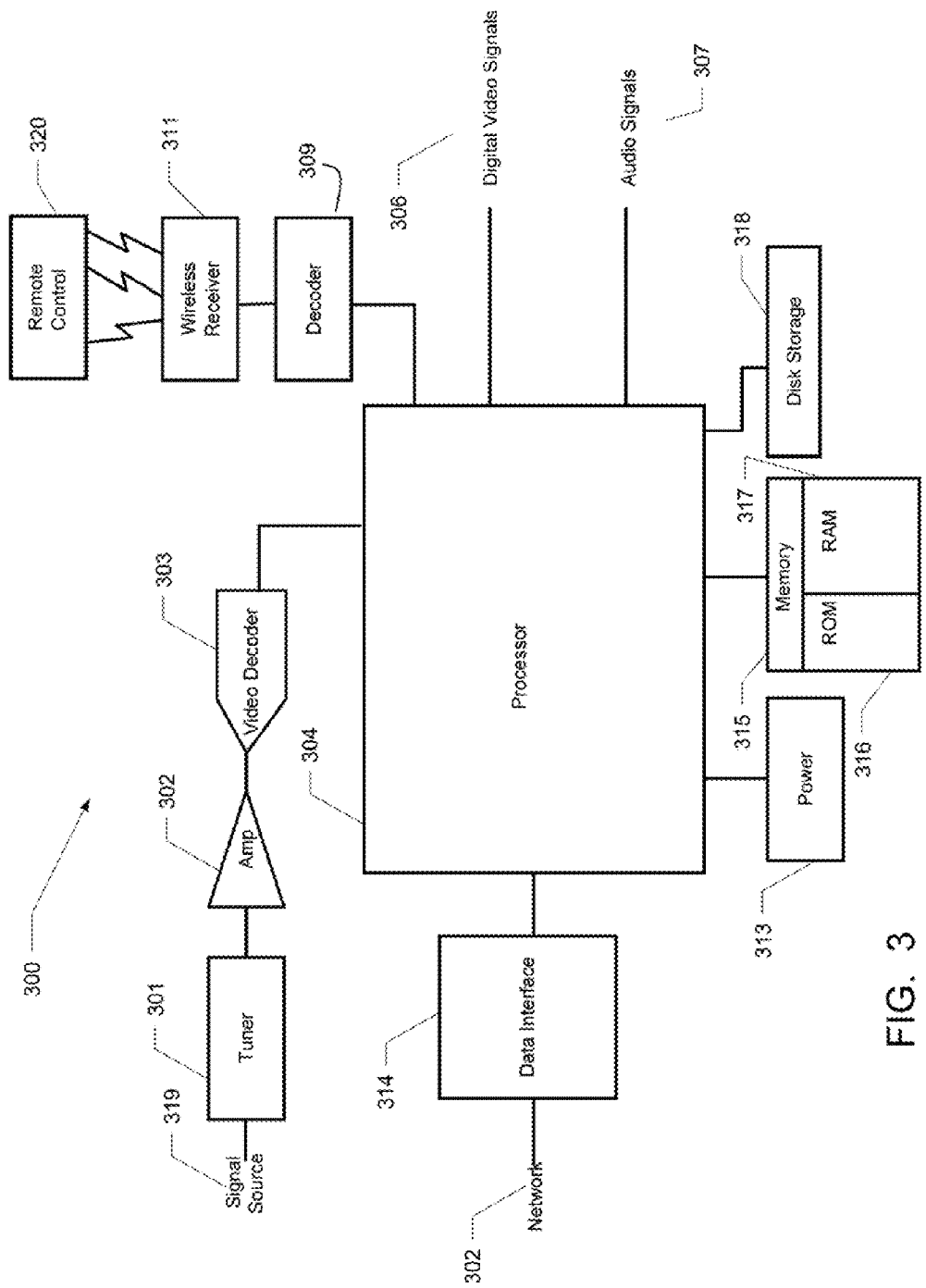
Figure 5A:
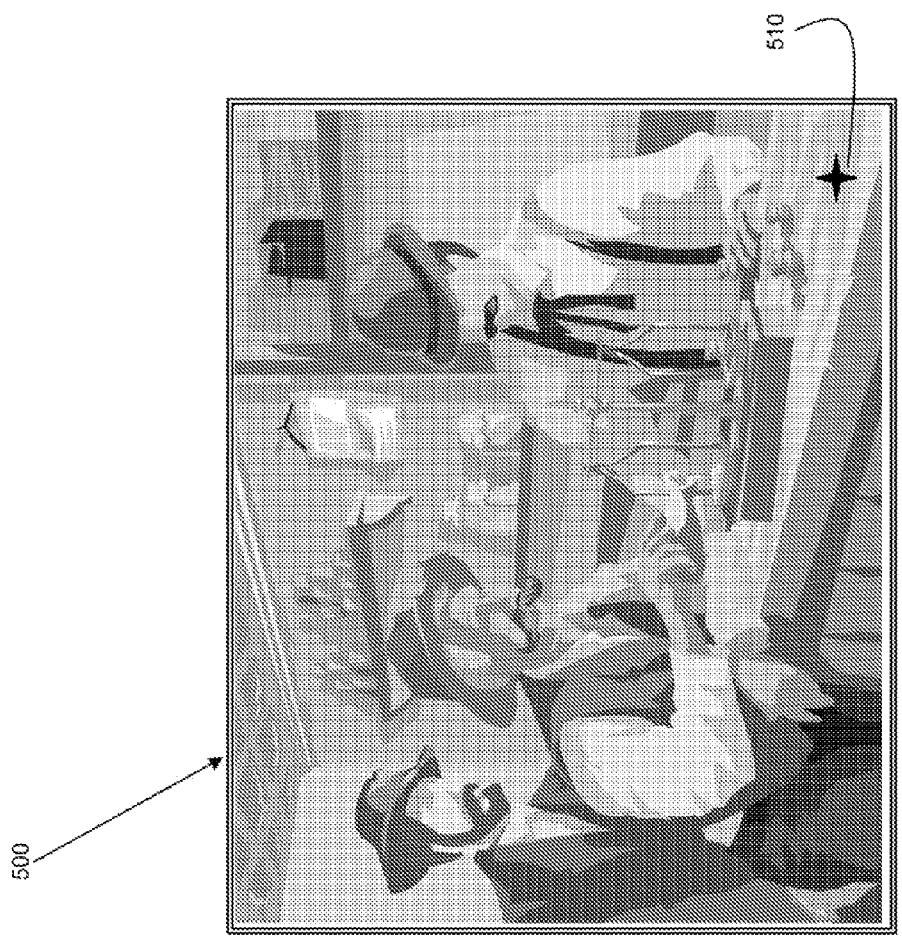
Figure 5B:

Having thus described the invention in general terms, reference will now be made to the accompanying drawings, which are not necessarily drawn to scale, and wherein:

FIG. 1a illustrates one embodiment of a network configured to provide embedded address information into a digital video stream, FIG. 1b illustrates one embodiment of a network configured to process a response to the embedded address information, FIG. 2 illustrates one embodiment of the steps performed in a set top box in response to receiving embedded address information, FIG. 3 illustrates one embodiment of the architecture of the set top box, FIG. 4 illustrates one embodiment of the steps performed in a server in response to receiving a response from the set top box, and FIGS. 5a and 5b illustrate one embodiment of the image produced in conjunction with receiving embedded address information in a digital video stream.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Although certain methods, apparatus, systems, and articles of manufacture have been described herein, the scope of coverage of this patent is not limited thereto. To the contrary, various embodiments encompass various apparatus, systems, and articles of manufacture fairly falling within the scope of the appended claims either literally or under the doctrine of equivalents.

As should be appreciated, the embodiments may be implemented in various ways, including as methods, apparatus, systems, or computer program products. Accordingly, the embodiments may take the form of an entirely hardware embodiment or an embodiment in which computing hardware, such as a processor or other special purpose devices, is programmed to perform certain steps. Furthermore, the various implementations may take the form of a computer program product on a computer-readable storage medium having computer-readable program instructions embodied in the storage medium. Any suitable computer-readable storage medium may be utilized including but not limited to hard disks, CD-ROMs, optical storage devices, or magnetic storage devices.

The embodiments are described below with reference to block diagrams and flowchart illustrations of methods performed using computer hardware, apparatus, systems, and computer-readable program products. It should be understood that the block diagrams and flowchart illustrations, respectively, may be implemented in part by a processor executing computer-readable program instructions, e.g., as logical steps or operations executing on a processor in a computing system or other computing hardware components. These computer-readable program instructions are loaded onto a computer, such as a special purpose computer or other programmable data processing apparatus, to produce a specifically-configured machine, such that the instructions which execute on the computer or other programmable data processing apparatus implement the functions specified in the flowchart block or blocks.

Overview

The capabilities disclosed herein include an embodiment where a link identifier ("LI") data is inserted into a video stream, such as an MPEG based stream prior to transmission on the cable distribution network. In one embodiment, the link identifier is a URL of a website that is conveyed using an Extended Binary Interchange Format ("EBIF") based applications, referred to broadly herein as an "EBIF application.". The EBIF application formats and procedures are well known to those skilled in the art. The LI data is received by a consumer device, which is typically in the form of a set top box, but in other embodiments, this device can be other types of devices, such as a DVR or digital television. The set top box uses the LI identifier to access video data or other types of data, typically via an Internet connection, where the video data is distinct from the video data streamed in the MPEG stream. In one embodiment, the consumer device generates a window which is overlaid on the television image and displays video from a website identified by the LI. In many instances, the information presented to the viewer from the LI data is related to product information featured in an advertisement conveyed by the MPEG stream.

In one embodiment, the set top box extracts the LI data from the MPEG stream, and automatically generates the window for the display of the external video information. Typically, a window is over-laid on the television image viewed by the viewer. The set top box then establishes a data communication path to an EBIF proxy server using the address indicated by the LI data. The proxy server relays requests and responses to a destination server, with the result that responses from the destination server are also relayed to the set top box. The proxy server may screen the requests/responses against a list of allowed requests/responses. In one embodiment, the proxy service may also transcode video received from the destination server into the same MPEG protocol received by the set top box. Upon completion of presenting the external video, the window is closed.

The destination server may store supplemental advertisement related information, which can provide additional product information to a viewer when viewing a commercial. Thus, an advertiser arranging to have an advertisement (a.k.a. commercial) streamed to a viewer can also provide supplemental product information via the destination server. As used herein, the "ad" or "commercial" typically refers to a MPEG based digital video stream transmitted to a cable set top box, and the "supplemental product information" (or "supplement data", "supplemental information") refers to the data provided by the destination server and relayed by the proxy server to the set top box. Because the destination server typically stores supplemental product information, it is referred to as a "supplemental server" or "advertising server" to distinguish it from the proxy server. The use of these labels is descriptive, and does not limit the scope of the invention. Thus, there is no inherent requirement that a supplemental server must store product information related to an ad, but that is often the case.

System Architecture

One embodiment of the system architecture associated with the invention is shown in FIG. 1. FIG. 1 shows a system 100 comprising components 125 in a cable system headend that generates one or more MPEG based video streams. These streams are received by a multiplexor 155, which combines the streams onto the cable distribution network 120. For sake of illustration, multiplexor 155 only shows receiving one stream, which may have multiple elementary streams. Other MPEG streams may be present, which are not shown. Typically, the cable distribution network is a hybrid fiber coaxial network, but a variety of technologies and configurations can be used. Further, although illustrated in the context of a cable service provider, the principles of the present invention can be applied to other service providers, including by way of example and not limitation: satellite providers, fixed wireless providers, and other television distribution technologies.

The viewer is present at a serving location, which typically includes a co-located consumer device in the form of a set top box 105 and a digital television 106 co-located. Although the system is illustrated using a set top box and television, the principles apply to other types of consumer devices. These could include computers outfitted with television tuners, satellite set top boxes, televisions with integrated CableCARD® conditional access devices, digital video recorders, etc. For purposes of illustration, and not by way of limitation, the consumer device will be described as being the television.

The MPEG stream delivered to the consumer device includes the LI. In one embodiment, the LI is a URL (universal resource locator) or web address used to identify the supplemental server at which the associated supplemental product information can be found. The incorporation of the LI into the advertisement digital video data, typically in an MPEG-2 format, can occur various ways. In one embodiment, the LI or URL is included in an EBIF application, which is embedded in the MPEG video stream. The LI data can be incorporated into different types of MPEG video and it does not have to be an advertisement. The MPEG video can be a movie, news program, documentary, etc. These video streams can originate from a stored file in memory in the cable headend, be received in a live broadcasting feed, or contained in a digital video file of a program stored in a VOD or Ad repository. Other mechanisms are possible than using an EBIF application for conveying the LI or URL in an MPEG stream.

The EBIF application can be incorporated into the MPEG ad stream in various ways. One embodiment involves storing the URL information in an EBIF application in a digital video file in a database 127, which represents an advertisement ("ad"). In this illustration, the ad database 127 stores various local ads that are inserted by the cable operator at certain times. The selection of the ad is made by an Ad Management System 124 that uses various criteria for selecting a particular ad for insertion into the video stream 115, thereby producing a modified video stream 115a. The ad is streamed to a splicer 123, which inserts the ad into the video stream 115. In this case, the ad is produced with the EBIF application already embedded within the ad digital file, and stored ad such in the ad store 127. Thus, when the ad is selected and streamed by the ad management system 124, the EBIF comprising the LI is embedded therein. No separate actions are necessary to insert the EBIF application into the MPEG data stream by the cable service provider. In other embodiments, the ad may be a national ad, so that the incoming video stream 115 already has the ad and the associated LI present. Thus, instead of storing a commercial comprising the EBIF application, the commercial via a MPEG stream could be received which already comprises the EBIF application.

The EBIF Management System typically is informed by the Ad Management System as to which advertisement is selected to be inserted. This is typically done by conveying an advertisement identifier to the EBIF Management System. The EBIF Management system then knows what ad is selected, and can then select an appropriate EBIF application indicating an appropriate supplemental server. For example, if the ad is for a Brand X trunk, the EBIF Management System could select an EBIF application indicating a link to a supplemental server providing information on Brand X trunk. However, if the ad is for a Brand X car, then a corresponding different EBIF application may be selected.

In another embodiment, the local cable operator may insert the LI via an EBIF application or other module into the advertisement as the ad is streamed. This represents an embodiment where the ad and EBIF application is locally inserted. This embodiment is shown in FIG. 1 as an EBIF Management System 117, which provides the appropriate EBIF application at line 118 which is combined by splicer (multiplexor) 123 with the streamed ad so that the resulting video stream with the EBIF application comprising the LI is sent to the multiplexer 155. The MPEG data comprising the EBIF application 128 is then transmitted to the set top box over the cable distribution network.

The EBIF Management System may inform the proxy server 150 of the EBIF application selected. The purpose is to directly or indirectly inform the proxy server of the link information that is being sent over the cable system in the EBIF application. The proxy server then knows to expect potential requests from set top boxes indicating the link information. Because the proxy server may limit or otherwise control which supplemental servers that can be accessed, the proxy server uses link information to screen or test EBIF response messages generated from the set top boxes.

In other embodiments, the LI can be embedded into a movie program by the movie distributor, or prior to receipt by the cable service provider. In this case, similar to the national ad case described above, the incoming MPEG programming already comprises the EBIF application comprising the LI, and no further processing is required to insert the LI. In other embodiments, the LI data can be inserted at different points—it is not required that it be inserted at splicer 123, but can be provided to the multiplexor 155.

The EBIF application provides a mechanism for the transport of data over a cable distribution network to a set top box where the EBIF application is processed by a "thin client" resident in the set top box. In this embodiment, the set top box is the consumer device, which processes the LI. The EBIF structure is well known to those skilled in the art, and recognized as one mechanism that can be used to transfer data outside of the video data carried by the MPEG protocol. If an EBIF application is used to convey the link information, a message must be sent to the consumer device after the EBIF application is sent, to initiate execution of the application in the set top box. This can be referred to as a "trigger" message. This scenario describes a so-called "bound" EBIF application where the EBIF application is associated with the program that conveys the EBIF application. Typically, if the EBIF application is sent in conjunction with an advertisement, the trigger message is sent shortly thereafter. However, as noted, the EBIF application could be sent in movies or other non-advertisement programs.

The actual mechanism for conveying the LI data could also occur in other ways than using an EBIF application. The LI data could be conveyed as a Packetized Elemental Stream ("PES") in the data payload using a standard or proprietary protocol for conveying IP formatted messages. In this embodiment, the stream_type value can be used to indicate that private data is present. In another embodiment, the LI could be conveyed using a standard or proprietary protocol using "PES private data" contained in the PES packet header. Other embodiments for conveying the LI data will be recognized by those skilled in the art of MPEG or other video encoding protocol based processing. A number of video protocols incorporating private data, or video protocols supporting a standardized fields for a video link could be used.

When the EBIF application is detected by the set top box, the set top box will typically generate a screen icon to be presented to the user. This is shown in FIG. 5a. In FIG. 5a, a television image 500 is presented to the user. In this embodiment, this could be a commercial which was locally inserted by a cable service provider on the cable distribution network. The cable system provider could further insert an EBIF application into the digital video stream which is received by the set top box. In one embodiment, the set top box automatically generates an icon 510 upon detecting the EBIF application. In another embodiment, a trigger message is transmitted to the set top box causing the set top box to then generate the icon 510 on the screen. In various embodiments, the icon can be of dynamic shape or may have multiple states (e.g., changing color, shape, or position) to attract attention of the viewer. In other embodiments, the icon can be static. Data could be conveyed in EBIF application defining an image to be presented, or data may be otherwise conveyed in the EBIF application defining the icon to be presented. The icon serves as a prompt to the user indicating that further information can be obtained by requesting information associated with the LI.

In one embodiment the user can acknowledge or respond to the icon by pressing a function key on the remote controller.

Typically, a wireless control key indicates that the user desires to open a new window and access the content indicated by the LI. The EBIF thin client in the set top box interprets the input as indication the user desires to continue. If the user does not respond, the icon typically disappears after a time period, and the television video proceeds as normal.

Upon the user providing input in response to viewing the icon, in FIG. 5b the set top box transmits a message to the cable headend. Contemporaneously, the set top box will create a new window 520 on the screen. Upon receiving a response from the cable headend, the set top box populates the window 520 with information provided to the set top box. Although window 520 illustrates displaying text in this embodiment, it typically displays video to the viewer. Obviously, the figures contained herein can only display a static data, but are meant to represent potentially displaying video data. In one embodiment the window 520 remains open as long as the user does not indicate it is no longer desired, or it can automatically close upon expiry of a timer, receipt of a command, or at the end of the commercial.

FIG. 1b illustrates some of the processing that occurs when the user acknowledges or otherwise selects the icon that is presented on the image. In FIG. 1b, upon the viewer pressing the remote control, the set top box 105 interprets the viewer input and then initiates a response to the EBIF application ("EBIF response message"), which is conveyed back from the set top box over the cable distribution network 120, through the multiplexer 155 and to a proxy server 150. The EBIF response message typically includes a portion of data included in the EBIF application, namely at least a portion of the LI. An identifier associated with the set top box may also be included in the response. In one embodiment, the set top box identifier could be an IP address, which can be used to identify the originating set top box. In this way, the proxy server 150 then knows which set top box responded to which EBIF application, and knows which external source to access. Recall that there may be multiple users viewing multiple programs or commercials. Each digital video program may have a unique embedded LI contained therein, so the proxy server may receive a number of requests associated with different commercials from different users.

Once the proxy server 150 receives the request, it uses the LI information to then access the supplemental server. In this embodiment, the supplemental server is an IP based server that is either internal 160 to the cable service provider or external 180. A router/gateway is used to ensure that the request from the proxy service is routed appropriately.

The proxy server may screen the response from the set top box based on the indicated LI. Recall that the proxy server may be directly or indirectly provided with the LI when the EBIF application was downloaded. Thus, the proxy server knows which supplemental servers are allowable destinations. The response from the set top box typically includes at least a portion of the LI information, and the proxy server may screen that information to ensure that improper modifications to the LI have not occurred by the set top box. Otherwise, the set top box may be allowed to access unauthorized IP servers. Thus, the proxy server may maintain a list of active destination addresses that may be accessed in conjunction with embedded LI information. In this manner, if LI information is contained in an advertisement (and is not inserted by the cable service provider), then streaming this information to the set top box will not allow the set top box to access the indicated destination if the proxy server has not been informed and has not authorized the address. Furthermore, prior to initiating a message to the supplemental server, the proxy server may substitute its own IP address (or another value) as the originating address instead of passing the set top box's IP address. In this manner, the proxy server controls the ability of each set top box to interact with embedded address information transported as private MPEG data in the digital video streams.

Similarly, responses from the IP servers are returned back to the proxy server 150. The response can be similarly screened at the proxy server prior to relaying the information back to the set top box. The response from the IP server can be checked to ensure that no unauthorized executable codes are embedded within. If the information is allowed, then the proxy server 150 relays the response information back to the originating IP address. The proxy server may maintain tables so that the response from the supplemental server can be mapped to the appropriate set top box originating address.

FIG. 2 illustrates the processing 200 that occurs in the consumer device, which in this embodiment is the set top box. The consumer device is presumed to be receiving an MPEG based video stream from the cable distribution network, and processing the packetized elemental streams for a presently viewed program. Thus, in step 202, the consumer device is receiving and parsing the MPEG packetized elementary stream ("PES") in order to identify whether there is any private data indicating a LI. In this embodiment, the LI is in the form of a URL. In step 204, the presence of a URL is determined and it is extracted. The private data that is parsed may convey other information than a LI, so the mere presence of private data does not mean that a LI is necessarily present.

In this embodiment, step 208 involves generating a cue image on the display screen. This image is typically an icon that is positioned on the screen, which indicates that additional information is available. In one embodiment, the image may be stored in memory, or it may be conveyed in the EBIF application itself. This may be a graphical image, or a text based image, and functions as a prompt to the user as to whether the additional video information should be presented. The image is retrieved in step 206 and generated on the screen in step 208. Once the cue is generated in step 208, a timer in step 210 is typically started. The consumer device then waits in step 212 for some sort of user input. Typically, the user input is indicated via the remote control (e.g., pressing an indicated function key). In some instances, the cue may instruct the viewer to press a specific key if additional information is desired. For example, "Press 1 to see additional information" could be displayed on the screen in addition or in lieu of the icon.

In step 214, if the timer expires, then the consumer device removes the cue from the display in step 216, and resumes processing in step 202. The URL, which was stored in memory, can be erased, or placed in an inactive queue. In other embodiments, mechanisms can be defined for a user to access the URL at a later time.

Assuming that in step 222 the user does provide an indication that the URL information should be presented and that the timer has not expired, the consumer device then uses the URL to formulate an EBIF response message to the proxy server. This could be in various message formats, and could be an Internet protocol formatted message. Further, this could use DOCSIS type communication protocols for communicating over the headend.

It should be noted that steps 206-222 are optional, and that the consumer device may access the URL immediately upon detecting LI information. However, in many instances, the user may not desire to be view the external video, and focus instead on viewing the program being streamed. However, to avoid unnecessary IP based requests to the URL that are not desired, some mechanism can be implemented so that only those acknowledged by the user result in a message launched by the consumer device.

In step 224, the consumer device accesses the proxy server using the URL previously extracted. In one embodiment, after communications has been established, the consumer device then opens a window on the display in step 226. This can be described alternatively as generating a new display picture and overlaying it on the television image presently being presented to the viewer. In some embodiments, the size of the window opened will be established by the user previously by setting parameters, or a default size and location may be used. Because in some cases the URL will present a video stream with audio, the consumer device may automatically mute the audio from the television program presently being viewed. In other embodiments, the user will have to manually mute the television audio. In other embodiments, the set top box may determine this based on the nature of the data in the response. Then, in step 232, the consumer device upon receipt of the data then presents it in the opened window. In some embodiments, the data received from the proxy server may be encoded in any one of the recognized video protocols, including Quicktime®, Flash®, or some other decoder standard. Of course, MPEG based video streams could be presented as well.

In step 234, the process continues as long as the external video is streaming. Once the processes is completed, then the window previously generated is closed is step 218, and the audio associated with the MPEG television program is restored. In other embodiments, the window closes upon the user indicating such via a remote control, wireless keyboard, or other device. The process then returns to step 202, in which incoming PES packets are examined to determine if there is a URL present.

The above process is performed in the consumer device, which can be the set top box, the television itself, or some other device in various embodiments. One architecture for the consumer device is shown in FIG. 3. The system 300 of FIG. 3 comprises a device that receives MPEG based video signals 319 at a tuner/demodulator 301. The signals may be amplified by an amplifier 302, which is then decoded by a video decoder 303. This provides digital video data to a processor 304. The processor receives the demodulated data and provides the appropriate signals for generating digital video signals 306 and audio signals 307.

In addition, the microprocessor 304 can also perform other functions, such as processing network data 302 at a data interface 314. This data can comprise the EBIF application, which the processor is programmed to interpret. The processor is typically also able to generated data back to the cable service provider using this same interface.

The processor is also connected to receive power from a power source 313, access memory 315 comprising both Ram 317 and ROM 315, or other types known to this skilled in the art. The processor 304 may also access disk storage 318. The various types of memory stores can store operating data, program instructions, and other information that is required. The processor is also shown in this embodiment as receiving signals from a decoder 309, which in turn interfaces with a wireless receiver 311 for receiving input signals from a remote controller 320.

The microprocessor can then receive the external video or other type of data via the Internet interface 314, and apply a video decoder resident in memory 315 to decode the information so as to generate the appropriate digital video signals, such that a window-over-picture image is created for the television set.

A similar architecture can be used for the EBIF Management System and the Proxy Server previously discussed. However, in these cases the tuner 301, amplifier 302, video decoder 303, wireless receiver 311, remote control 320, and decoder 309 are likely not present. The architecture used for the EBIF Management System and Proxy servers can comprise conventional processing systems executing programmable computer instructions for accomplishing the required steps.

Proxy Server Processing

The processing of the proxy server 150 is illustrated in FIG. 4. Recall that the set top box typically receives the EBIF application that has been streamed to the set top box and generates an EBIF response message either in response to user input, automatically when receiving the EBIF application, or in response to receiving a trigger message activating processing of the EBIF application.

The process then begins in step 400 with the proxy server receiving the EBIF response message, and in the embodiment shown in step 405, the proxy server extracts identification of the set top box and the destination address. The identification of the set top box can be in the form of a MAC address, IP address, or other identifier. The proxy server can map this to a IP address as needed. The destination address in the EBIF response message is typically obtained by the set top box copying information from the received EBIF application. Thus, the EBIF application conveys an identifier, which the set top box uses (or a modification thereof) in generating the EBIF response message. In one embodiment, the identifier in the EBIF response message is in the form of:

Proxyserver\[domain_name]

where "proxyserver" identifies the proxy server in the cable headend, and "domain_name" identifies the supplemental server. In other words, the address indicated in the EBIF response message is an Internet domain name, or portion thereof, which is preceded by "proxyserver" or other information which indicates that all such messages are sent first to the proxy server for processing. The proxy server then strips off the initial address and uses the remaining portion to form a URL address to which the query is launched. Thus, the EBIF response message contains an identifier which is used by the proxy server to directly or indirectly generate the URL of the supplemental server. In other embodiments, the cable network could simply route all traffic from the set top box to a proxy server, which then determines what supplemental server to access. Other variations can readily defined by one skilled in the art. Thus, it is not necessary that the actual, complete URL of the supplemental server be indicated in the EBIF response message. Rather, the EBIF response message can use an identifier which the proxy server uses to then derive (directly or indirectly) the appropriate URL of the supplemental server. Those skilled in the art will realize that they are a number of variations as to how the addressing can be conveyed.

The proxy server in step 405 screens the destination address indicating in the EBIF response message. The cable service provider may chose to limit which destinations (supplemental IP servers) the set top box can interact with. In most cases, an address indicated in an EBIF application sent to a set top box will have a corresponding entry in a list of allowable address locations in the proxy server. This allows the proxy server to know whether the destination address is authorized. However, in situations where a device would attempt to send a response message using an address not indicated in an EBIF application, or not that is not on the approved destination list, the proxy server will not relay the message to the supplemental server. In such cases, the proxy server may chose to record the message in its memory and report the event to a system administrator for further investigation.

In the case of "bound" EBIF applications, the EBIF application is associated with the MPEG stream (typically, an advertisement). Once the advertisement is completed, the EBIF application can no longer be activated, and can be erased. Consequently, the proxy server may automatically or otherwise erase destination addresses that it maintained for EBIF applications sent to set top boxes. After the EBIF application has been sent, there is a likely time window when legitimate EBIF response messages will be received indicating the associated address information. Thus, the proxy server may, in one embodiment, erase or otherwise mark the destination as expired after a defined time period from receipt of the address information.

In step 415, assuming the destination address is approved, the proxy server relays the message to the appropriate supplemental server. This is accomplished by formulating a message and sending it to a gateway/router, wherein the contents and destination address are derived from the message received from the set top box. The proxy server may replace the originating address in the message to the supplemental server with the proxy server's address, or it may use the set top box's IP address as the originating address. Other variations are possible. The proxy server may start a timer, or simply wait for a response from the IP server.

Typically, the proxy server will maintain a record of all transactions, which allows data mining as to the effectiveness of particular advertisements with respect to viewer demographics.

In step 420 the response from the supplemental server is received at the proxy server. In various embodiments, the proxy server may screen the response in step 425, to ensure that no executable code or other prohibited contents are included. The proxy server in step 430 then transmits the response back to the originating address, which is the originating set top box.

In this manner, the proxy server effectively controls the interaction of the set top box with the supplemental server involving any linking information included as private data in an MPEG video stream. This ensures that set top boxes can only access previously identified sites. Further, this ensures that no inappropriate responses are received from an IP server. Thus, a cable service provider could readily screen out destination IP addresses, or responses from specific IP servers, which result in technical issues with the set top boxes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts.

The invention claimed is:

1. A system comprising:
   an Extended Binary Interchange Format (EBIF) management system comprising a first processor configured to:
   insert an EBIF application into a Moving Picture Experts Group (MPEG) based video stream wherein said MPEG based video stream comprises an advertisement, wherein said EBIF application is inserted in said advertisement prior to transmission of said MPEG based video stream on a bi-directional cable distribution system, wherein said EBIF application comprises an identifier indicating an address of an advertising server; and
   an EBIF proxy server connected to said bi-directional cable distribution system wherein said EBIF proxy server comprises a second processor configured to:
   receive an EBIF response message generated by said set top box executing said EBIF application wherein said EBIF response message comprises said identifier;
   determine a destination address comprising a URL derived from said identifier;
   generate a second message from said EBIF proxy server to said advertising server using said URL;
   receive advertising related information from said advertising response to sending said second message; and
   transmit said advertising related information to said set top box.

2. The system of claim 1 wherein the second processor is further configured to:
   screen said destination address using a list of authorized destination addresses.

3. The system of claim 1 wherein the second processor is further configured to screen an originating address of said set top box indicated in said EBIF response message.

4. The system of claim 1 wherein said first processor of said EBIF management system is configured to select said EBIF application based on an identification of said MPEG based video stream.

5. The system of claim wherein said advertising related information comprises video information.

6. The system of claim 1 wherein said first processor is configured to convey said identifier indicating said address of said advertising server to said second processor.

7. The system of claim 6 wherein said second processor of said EBIF proxy server is configured to incorporate said address of said advertising server in said list of authorized destination addresses.

8. The system of claim 1 comprising a cable headend multiplexer, said multiplexer configured to
   a) receive said MPEG based video stream and transmit said MPEG based video stream over said bi-directional cable distribution network, and
   b) provide said EBIF response message to said EBIF proxy server.

9. The system of claim 7 wherein said second processor of said EBIF proxy server is configured to receive an originating address from said set top box and use said originating address when transmitting said advertising related information to said set top box.

10. A method for providing supplemental advertising information to a viewer on a cable distribution network comprising the steps of:
    streaming a Moving Picture Experts Group (MPEG) based video stream comprising an advertisement over said cable distribution network, wherein said MPEG based video stream includes data comprising an Extended Binary Interchange Format (EBIF) application, wherein said EBIF application further comprises an identifier indicating a server address of an advertising server storing said supplemental advertising information;
    receiving an EBIF response message at a proxy server from said set top box wherein said EBIF response message includes said identifier used to indicate said server address;
    generating a second message from said proxy server to said advertising server using a destination address derived from said server address;

receiving advertising related information at said proxy server from said advertising server; and transmitting said advertising related information by said proxy server to said set top box, wherein said advertising related information is displayed to said viewer.

11. The method of claim 10 wherein said proxy server is configured to screen a destination address generated from said EBIF response message.

12. The method of claim 11 wherein an EBIF management system selects said EBIF application to multiplex with said MPEG based video stream from a database comprising a plurality of EBIF applications.

13. The method of claim 10 further comprising the step of transmitting said identifier indicating said address of said advertising server from said EBIF management system to said EBIF proxy server wherein said identifier is stored in a memory of said EBIF proxy server.

14. The method of claim 13 wherein said EBIF proxy server uses said address to screen said originating address.

15. The method of claim 14 wherein said advertising related information is video encoded data.

16. The method of claim 10 further comprising the step of:
transmitting a trigger message to said set top box wherein said set top box executes said EBIF application.

17. The method of claim 11 wherein said proxy server erases said identifier indicating said address from said memory.

18. The method of claim 11 wherein said proxy server maintains a record of said originating address of said EBIF response message.

19. The method of claim 11 further comprising the steps of:
generating an image of an icon by the set top box for display on a television connected to said set top box;
receiving input from a viewer using the remote control; and
transmitting the EBIF response message from the set top box.

20. The method of claim 19 wherein said advertising related information is displayed to said viewer on said television by overlaying said advertising related information over an image corresponding to said MPEG based video stream.

21. A non-transitory computer readable storage medium storing instructions when executed on a processor cause said processor to perform the steps of:
store in a memory a first identifier associated with a supplemental server wherein said first identifier is indicated in an Extended Binary Interchange Format (EBIF) application transmitted to a set top box on a cable distribution network;
receive an EBIF response message generated by said set top box executing an EBIF application wherein said set top box is connected to said cable distribution system, wherein said EBIF response message comprises a second identifier;
use said first identifier and said second identifier to determine said EBIF response message indicates an authorized destination for requesting advertisement information from a supplemental server;
determine a destination address comprising a uniform resource locator derived from said second identifier;
generate a second message said processor to said supplemental server using said destination address;
receive said advertisement information from said supplemental server in response to sending said second message; and
transmit said advertising information to said set top box.

22. The non-transitory computer readable storage medium of claim 21 wherein said first identifier is indicated in an EBIF application transmitted to said set top box prior to receipt of said EBIF response message.

* * * * *